(12) United States Patent
Lee et al.

(10) Patent No.: US 8,024,671 B2
(45) Date of Patent: Sep. 20, 2011

(54) THREE-DIMENSIONAL GRAPHIC USER INTERFACE, AND APPARATUS AND METHOD OF PROVIDING THE SAME

(75) Inventors: Keum-Koo Lee, Seoul (KR); Sung-woo Kim, Seongnam-si (KR); Yong-hwan Kwon, Seongnam-si (KR); Ki-ae Seong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 11/583,914

(22) Filed: Oct. 20, 2006

(65) Prior Publication Data

US 2007/0097113 A1 May 3, 2007

(30) Foreign Application Priority Data

Oct. 21, 2005 (KR) .................. 10-2005-0099881

(51) Int. Cl.
*G06F 3/048* (2006.01)
(52) U.S. Cl. .................. 715/848; 715/836
(58) Field of Classification Search .................. 715/848, 715/850, 853
See application file for complete search history.

(56) References Cited

U.S. PATENT DOCUMENTS

| | | | | |
|---|---|---|---|---|
| 5,786,820 A | * | 7/1998 | Robertson | 715/853 |
| 5,880,733 A | * | 3/1999 | Horvitz et al. | 715/850 |
| 6,005,578 A | * | 12/1999 | Cole | 715/854 |
| 6,259,458 B1 | * | 7/2001 | Theisen et al. | 345/440 |
| 6,496,842 B1 | | 12/2002 | Lyness | |
| 6,590,593 B1 | * | 7/2003 | Robertson et al. | 715/782 |
| 6,661,437 B1 | * | 12/2003 | Miller et al. | 715/810 |
| 7,119,819 B1 | * | 10/2006 | Robertson et al. | 715/782 |
| 7,139,982 B2 | * | 11/2006 | Card et al. | 715/786 |
| 2003/0001898 A1 | | 1/2003 | Bernhardson | |
| 2004/0100479 A1 | * | 5/2004 | Nakano et al. | 345/700 |
| 2004/0109031 A1 | * | 6/2004 | Deaton et al. | 345/848 |
| 2005/0278691 A1 | * | 12/2005 | MacPhee | 717/104 |

FOREIGN PATENT DOCUMENTS

| | | |
|---|---|---|
| JP | 11039132 A | 2/1999 |
| JP | 2001337662 A | 12/2001 |
| JP | 2002056411 A | 2/2002 |
| JP | 2003-330586 A | 11/2003 |
| JP | 2004318325 A | 11/2004 |
| KR | 10-2000-0061224 A | 10/2000 |

OTHER PUBLICATIONS

NN9105464, IBM Technical Disclosure Bulletin, May 1991, US, vol. 33, Issue 12, pp. 464-465.*

* cited by examiner

*Primary Examiner* — Weilun Lo
*Assistant Examiner* — Shashi K Becker
(74) *Attorney, Agent, or Firm* — Sughrue Mion, PLLC

(57) ABSTRACT

An apparatus and method for providing a three-dimensional graphic user interface includes a control module which creates a three-dimensional interface space having a predetermined plane and an axis perpendicular to the plane, and a plurality of objects presented in the space, and a user interface module which presents a plurality of object groups including the plurality of objects in the space, and moves an object group including a selected object among the plurality of presented object groups along the axis.

25 Claims, 11 Drawing Sheets

THREE-DIMENSIONAL GRAPHIC USER INTERFACE, AND APPARATUS AND METHOD OF PROVIDING THE SAME

CROSS REFERENCE TO RELATED APPLICATION

This application claims priority from Korean Patent Application No. 10-2005-0099881 filed on Oct. 21, 2005 in the Korean Intellectual Property Office, the disclosure of which is incorporated herein by reference in its entirety.

BACKGROUND OF THE INVENTION

1. Field of the Invention

The present invention relates to a three-dimensional graphic user interface, and an apparatus and method of providing the same. In particular, the present invention relates to a three-dimensional graphic user interface that can increase visual effects and intuitively represent importance of information, and an apparatus and method of providing the same.

2. Description of the Related Art

In general, digital apparatuses use a graphic user interface (GUI) in order to allow convenient use and to rapidly and intuitively transfer information to a user. The user moves a pointer using a pointing device, such as a keypad, a keyboard, or a mouse, and selects an object indicated by the pointer, thereby instructing a desired operation to the digital apparatuses.

FIG. 1 is a diagram showing a GUI that is supported by a related art personal computer (PC) operating system.

As shown in FIG. 1, the related art user interfaces (UI) are two-dimensional, planar, and static UIs. Accordingly, since the forms of information to be displayed by the UIs are document-oriented, it is not enough to satisfy sensitivity of a user, and there is a limit to visually and effectively provide information. In addition, objects to be provided by the related art GUIs include three-dimensional objects, but these three-dimensional objects do not vary from a two-dimensional concept. For this reason, the objects are three-dimensionally viewed, but the merits of the three-dimensional objects are not utilized in view of a method of using the objects.

The GUI of the PC operating system is not suitable for all digital apparatuses. For example, in the case of an apparatus that provides multimedia contents, the existing UIs have limits on their ability to satisfy the sensitivity of the user and to provide entertainment functions. In order to solve the above problems, various techniques (for example, a technique disclosed in Korean Unexamined Patent Application Publication No. 2000-061224, entitled "Method of Displaying Menu Picture of Video Apparatus") have been suggested, but the above problems have not been solved yet.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a three-dimensional GUI that can increase visual effects and intuitively represent importance of information, and an apparatus and method of providing the same.

The present invention is not limited to those aspects mentioned above, and other aspects of the present invention will be apparently understood by those skilled in the art through the following description.

According to an aspect of the present invention, there is provided an apparatus for providing a three-dimensional GUI including a control module creating a three-dimensional interface space having a predetermined plane and an axis perpendicular to the plane, and a plurality of objects that are presented in the space, and a user interface module presenting a plurality of object groups including the plurality of objects in the space, and moving an object group including an object selected by a user among the plurality of presented object groups along the axis.

According to another aspect of the present invention, there is provided a method of providing a three-dimensional GUI including creating a three-dimensional interface space having a predetermined plane and an axis perpendicular to the plane, and a plurality of objects that are presented in the space, presenting a plurality of object groups including the plurality of objects in the space, and moving an object group including an object selected by a user among the plurality of presented object groups along the axis.

According to still another aspect of the present invention, there is provided a three-dimensional graphic user interface, in which a plurality of object groups including a plurality of objects is presented in a three-dimensional interface space having a predetermined plane and an axis perpendicular to the plane, and an object group including an object selected by a user among the plurality of presented object groups moves along the axis.

According to yet another aspect of the present invention, there is provided a computer readable medium having stored therein a program for causing a processing device to execute a method for providing a three-dimensional graphic user interface, the program instructions including creating a three-dimensional interface space having a predetermined plane and an axis perpendicular to the plane, and a plurality of objects presented in the space, presenting a plurality of object groups including the plurality of objects in the space, and moving an object group including a selected object among the plurality of presented object groups along the axis.

BRIEF DESCRIPTION OF THE DRAWINGS

The above and other aspects of the present invention will become more apparent by describing in detail exemplary embodiments thereof with reference to the attached drawings, in which.

DESCRIPTION OF THE EXEMPLARY EMBODIMENTS

Figure 1:
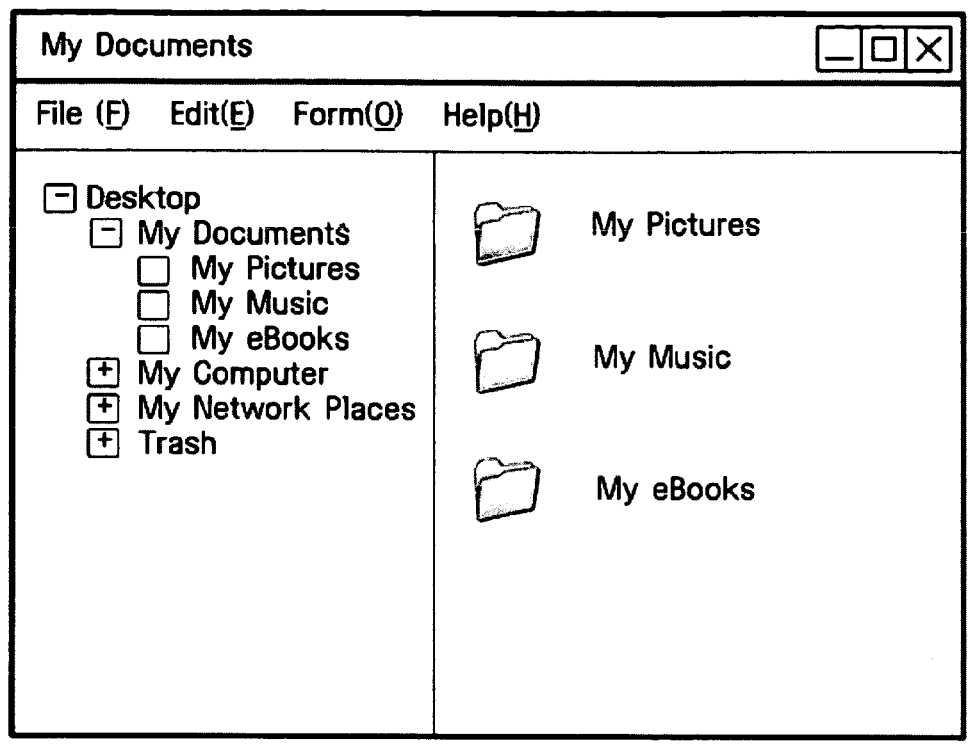
FIG. 1 is a diagram illustrating a related art user interface.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will be described hereinafter with reference to block diagrams or flowchart illustrations of a three-dimensional GUI according to an exemplary embodiment thereof. It will be understood that each block of the flowchart illustrations and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the block diagrams may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

Figure 2:
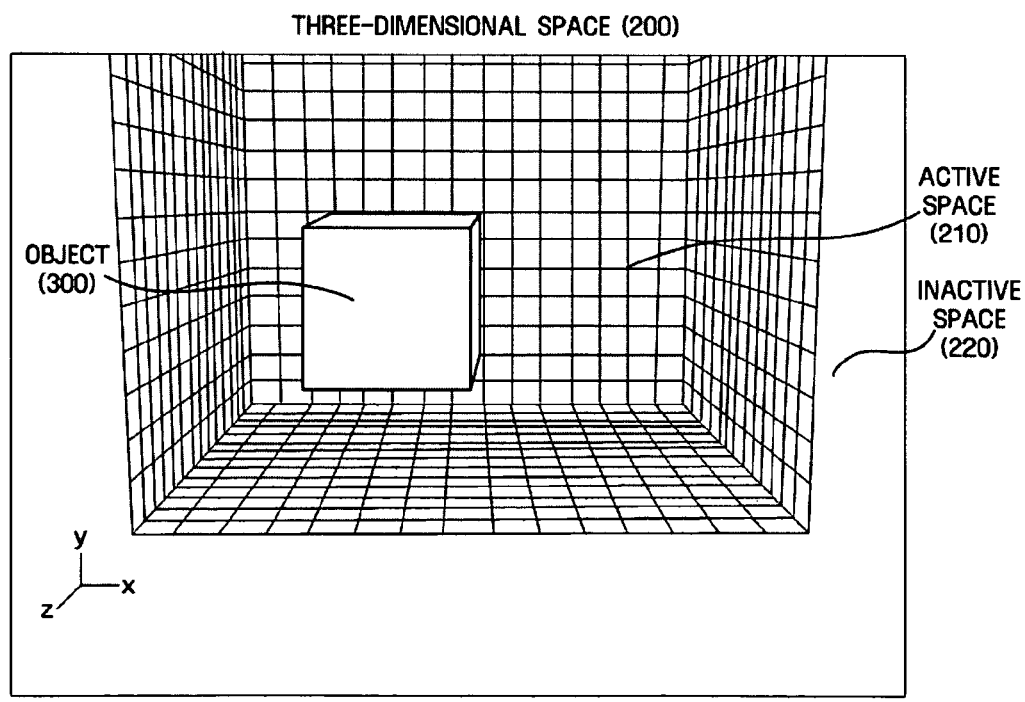
FIG. 2 is a diagram illustrating the configuration of a three-dimensional GUI according to an exemplary embodiment of the present invention.

FIG. 2 is a diagram illustrating the overall configuration of a three-dimensional GUI according to an exemplary embodiment of the present invention.

The three-dimensional GUI according to an exemplary embodiment of the present invention is a UI concept that can construct dynamic GUI environments based on three-dimensional environments and motion graphics. The three-dimensional GUI environment has the following elements.
1. Three-Dimensional Space
2. Object
3. Camera View
4. Object Presentation Method First, a three-dimensional space 200 is a spatial region that constructs the three-dimensional environment, and can be divided into an active space 210 and inactive space 220. The active space 210 can be used in design of the UI. The three-dimensional space 200 can have various forms according to division methods of the active space 210 and the inactive space 210. For example, in FIG. 3, an active space 1210 that is limited in X-axis and Z-axis directions but is unlimited in a Y-axis direction can be defined. That is, referring to FIG. 3, the active space 1210 is defined to be limited within a region defined by a reference surface in the X-axis and Z-axis directions, but to be unlimited beyond the reference surface in the Y-axis direction.

Figure 3:
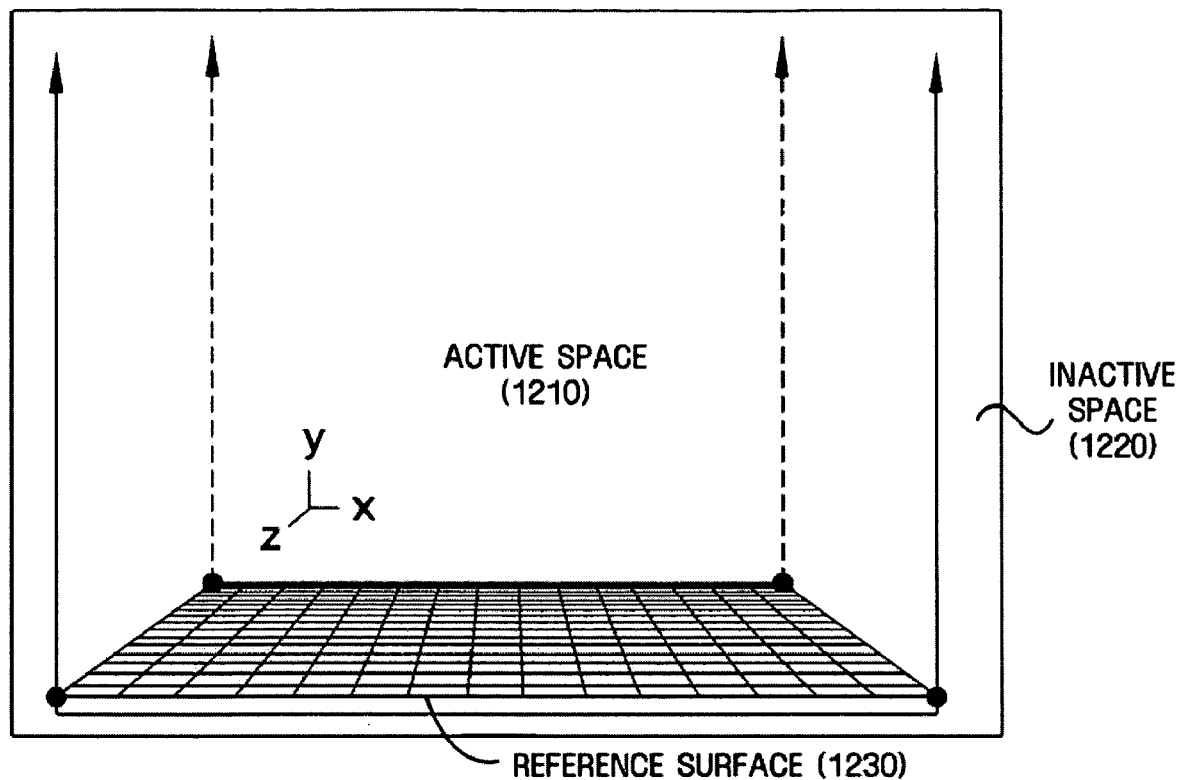
FIG. 3 is a diagram illustrating a change in a three-dimensional space according to the division of an active space and an inactive space according to the exemplary embodiment of the present invention.
Figure 4:
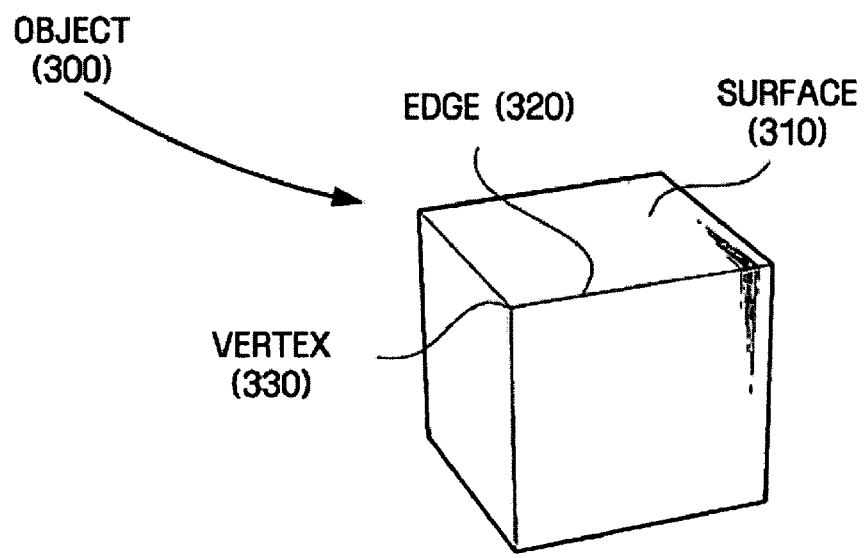
FIG. 4 is a diagram illustrating an object according to the exemplary embodiment of the present invention.

An object 300, as illustrated in FIG. 4, interacts with the user under the three-dimensional environment and provides information. The object 300 can exist within the active space of the three-dimensional space. For example, when the inactive space and the active space are as illustrated in FIG. 3, the object 300 can be located only in a space defined by poles indicated by arrows, and cannot be located outside the space defined by the poles indicated by the arrows or in a space below the reference surface.

The object 300 may be represented, for example, by a polyhedron, such as a hexagon, a rectangle, a triangle, or a cylinder, or a polygonal surface. FIG. 4 illustrates a case where the object is represented by a hexahedron. The object can have attributes, such as the number, color, transparency, information surface, or the like. Object attributes are not limited to the above-described attributes, and various attributes can exist depending on the application fields.

Surfaces constituting the object 300 function as the information surface. Here, the information surface means a surface on which information to be transmitted to the user can be displayed. Information about controllable menu items or individual submenus can be transmitted through the information surface. On the information surface, texts, images, motion pictures, or two-dimensional widgets corresponding to 2D visual information can be displayed. Further, three-dimensional information, such as three-dimensional icons or the like, can be displayed on the information surface.

The object 300 may generate unique motions in the three-dimensional space. For example, as illustrated in FIG. 2, if a hexahedron object 300 exists in the three-dimensional space, the hexahedron object 300 may rotate by an arbitrary angle around an arbitrary axis among the X, Y, and Z axes in a clockwise direction or counterclockwise direction. Further, the object 300 may generate motions, such as positional movements, or expansion or reduction in size. The motions of the object may be generated by commands input by the user or may be generated according to the movements of a camera view that functions as a view point in the three-dimensional space.

Figure 5:
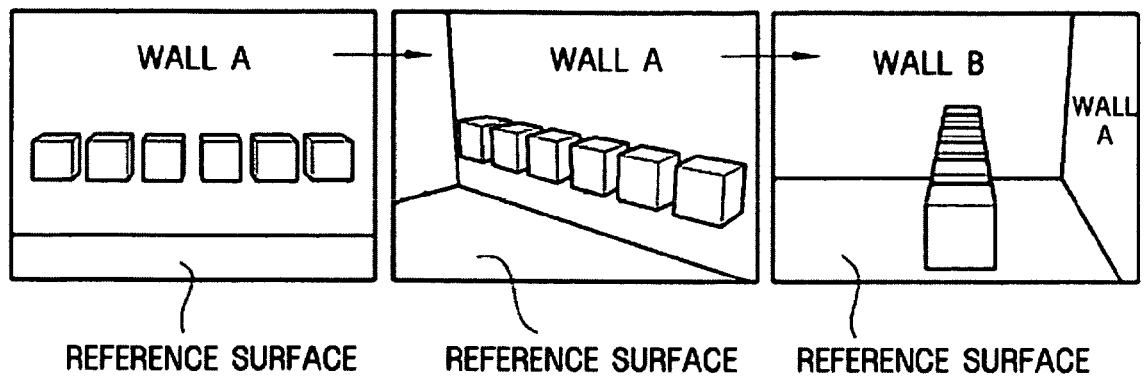
FIG. 5 is a diagram illustrating a case where motions are generated in the object on the basis of the movements of a camera view according to the exemplary embodiment of the present invention.

The camera view means a view point in the three-dimensional space. The camera view can move in the three-dimensional space. The movement of the camera view means that the navigation occurs in the space, and thus the motion is generated in the space. The camera view generates motion in the three-dimensional GUI environment, together with unique motion attributes of the objects. FIG. 5 illustrates a case where all objects in the three-dimensional space rotate in the clockwise direction as the camera view rotates in the counterclockwise direction.

Figure 6A:
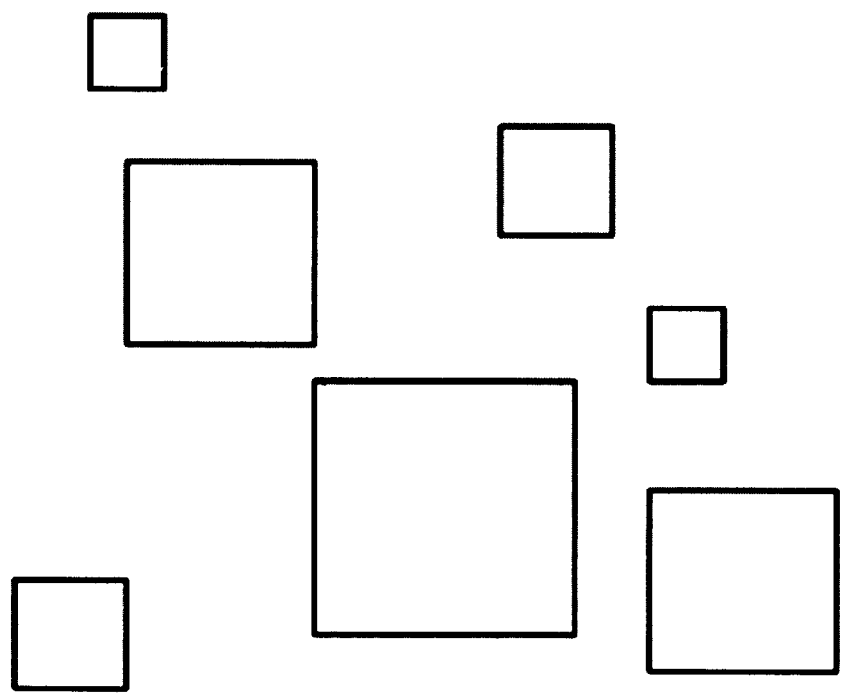
FIG. 6A to 6C are diagrams illustrating a method of presenting a plurality of objects.
Figure 6B:
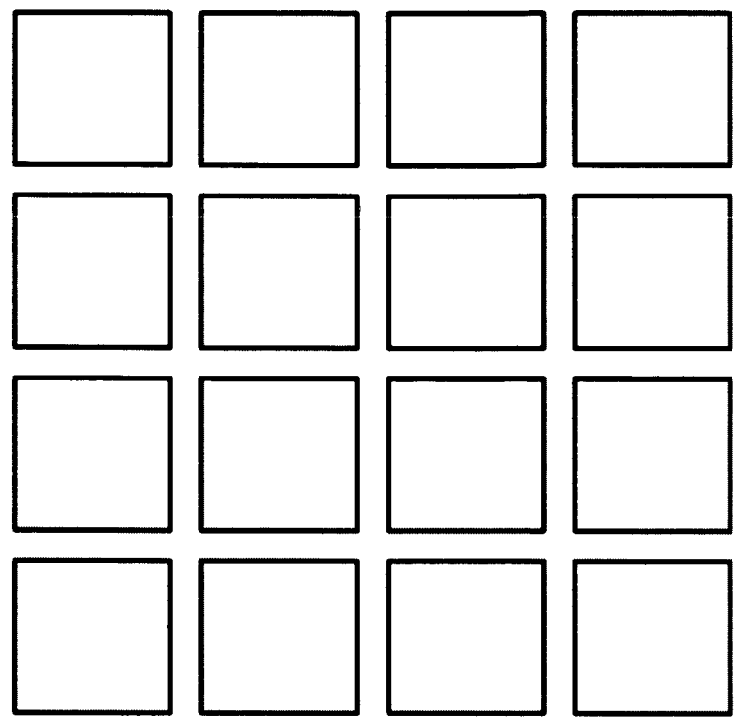
Figure 6C:
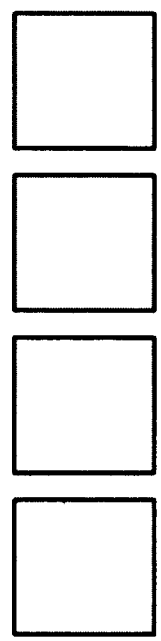

The object presentation method is a method of determining how one or more objects are grouped in the three-dimensional space and presented on a screen. For example, as illustrated in FIG. 6A, the objects in the same group may be presented close to or distant from the user in the Z-axis direction. Alternatively, as illustrated in FIGS. 6B and 6C, the objects in the same group may be presented in a lattice shape or in a row. Hereinafter, in the exemplary embodiment of the present invention, a case where the objects in the same group are presented in a row will be described.

Figure 7A:
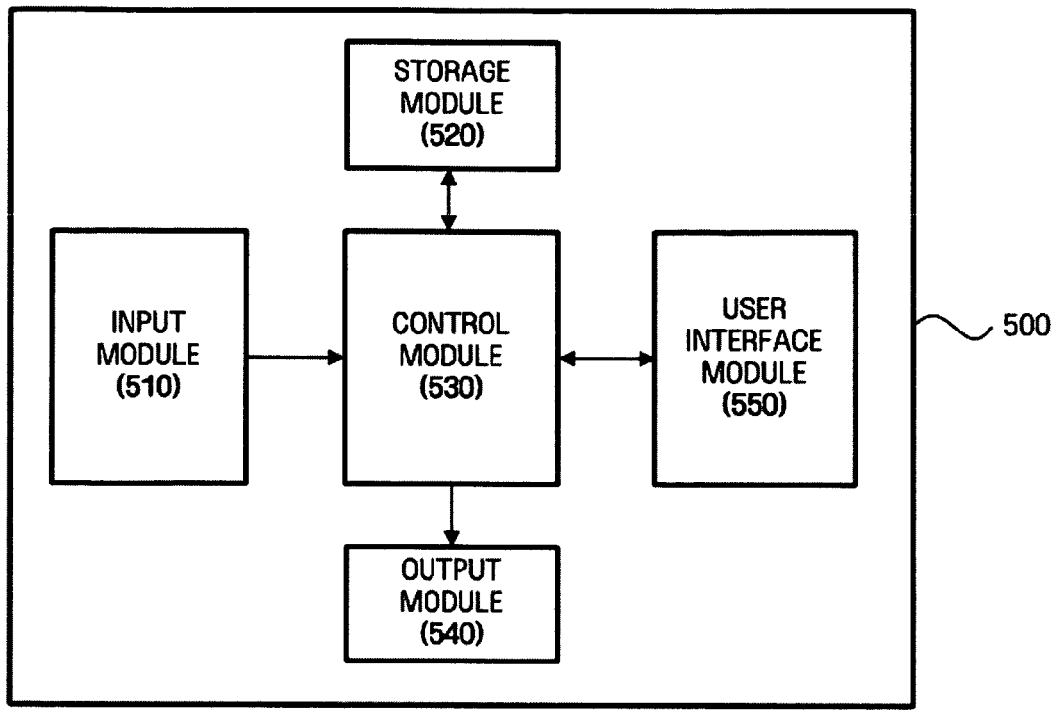
FIG. 7A is a block diagram illustrating a three-dimensional GUI providing apparatus according to the exemplary embodiment of the present invention.

FIG. 7A is a block diagram illustrating a three-dimensional GUI providing apparatus 500 according to the exemplary embodiment of the present invention.

The three-dimensional GUI providing apparatus 500 according to an exemplary embodiment of the present invention can have a digital apparatus. Here, the digital apparatus means an apparatus having a digital circuit that processes digital data, for example, but not limited to, a computer, a printer, a scanner, a pager, a digital camera, a facsimile machine, a digital copy machine, a digital appliance, a digital phone, a digital projector, a home server, a digital video recorder, a digital TV broadcasting receiver, a digital satellite broadcasting receiver, a set-top box, a personal digital assistant (PDA), and a cellular phone.

The three-dimensional GUI providing apparatus 500 shown in FIG. 7A includes an input module 510, an output module 540, a control module 530, a storage module 520, and a user interface module 550.

The input module 510 receives data related to the action of the object, that is, data for accessing the object or selecting a predetermined object, from the user. The input module 510 can be implemented by, for example, but not limited to, a mouse, a keyboard, a keypad, a touch pad, or a joystick. When the input module 510 is implemented by a keypad, the input module 510 has a plurality of function keys. For example, the input module 510 may have a menu key (not shown) that outputs a menu list (see reference numeral 710 of FIG. 8A) to be provided by the three-dimensional GUI providing apparatus 500, direction keys (not shown) that move a focus in the output menu list 710, and a selection key (not shown) that selects the focused menu. When the key is operated by the user, a predetermined key signal is generated. The key signal generated by the input module 510 is supplied to the control module 530. The input module 510 may be implemented integrally with or may be implemented separately from the three-dimensional GUI providing apparatus 500 in hardware.

The control module 530 creates the three-dimensional space or the objects and connects and manages other modules. For example, the control module 530 generates a command corresponding to the key signal input through the input module 510, and controls the operation of the user interface module 550.

The storage module 520 stores the three-dimensional space and the objects created by the control module 530, and information about attributes of the objects. For example, the storage module 520 stores information about whether or not each surface constituting the object is the information surface and information about the color and transparency of the information surface. In addition, the storage module 520 stores positional information of the objects that are presented in the active space. For example, a menu to be provided by the three-dimensional GUI providing apparatus 500 may have items of TV, DVD, INTERNET, GAME, and so on, and the items may have separate objects. As such, when the menu key (not shown) is operated, the objects constituting the menu are arranged according to the prescribed positional information in the active space. The storage module 520 may be implemented by at least one of a nonvolatile memory device, for example, but not limited to, a ROM (Read Only Memory), a PROM (Programmable ROM), an EPROM (Erasable Programmable ROM), an EEPROM (Electrically Erasable Programmable ROM), or a flash memory, and a storage medium, such as a hard disk drive (HDD). However, these devices are not intended to limit the present invention.

Meanwhile, the user interface module 550 provides the three-dimensional graphic GUI using the three-dimensional space or the objects created by the control module 530.

Figure 7B:
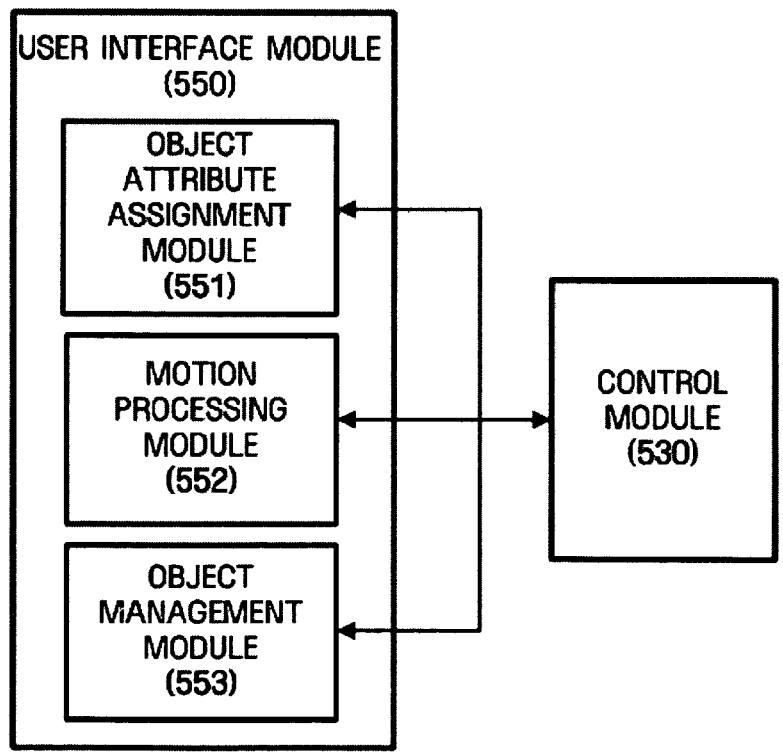
FIG. 7B is a block diagram illustrating a user interface module shown in FIG. 7A in detail.

FIG. 7B illustrates the configuration of the user interface module 550 in detail. The user interface module 550 illustrated in FIG. 7B has an object attribute assignment module 551, a motion processing module 552, and an object management module 553.

The object attribute assignment module 551 assigns the above-described attributes to the objects created by the control module 530, and maps information to be displayed on the information surface of the polyhedron object depending on the attributes.

Figure 8A:
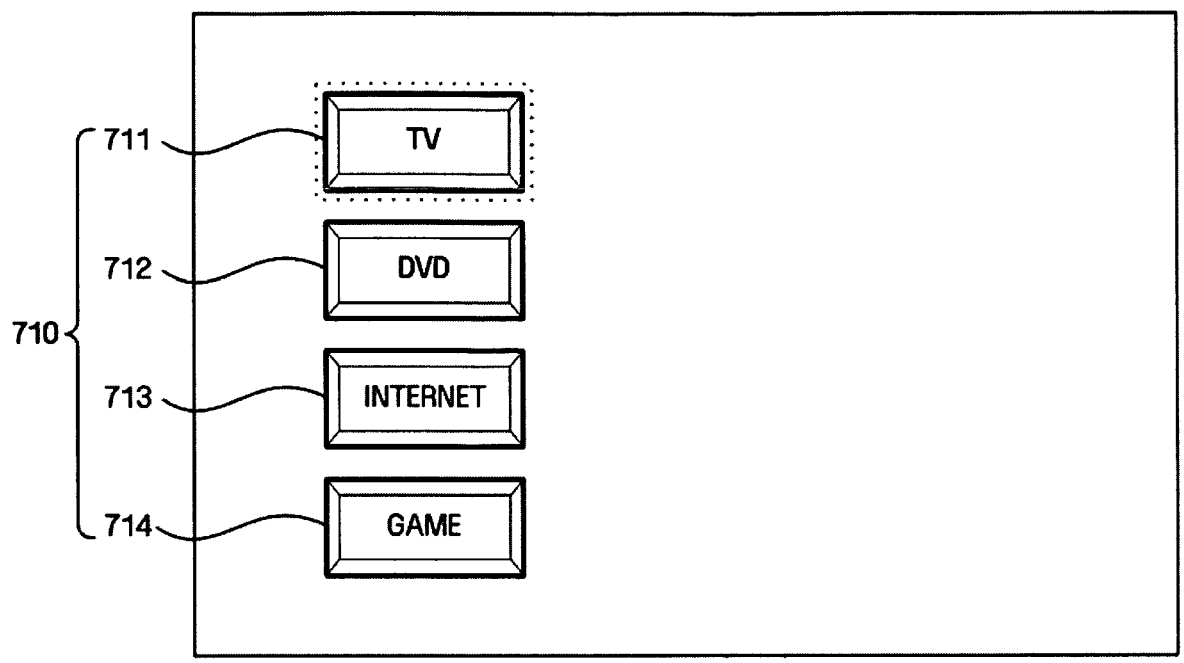
FIG. 8A to FIG. 12B are diagrams and top views illustrating a GUI provided by the three-dimensional GUI providing apparatus shown in FIG. 7A.

When the user selects a predetermined object in a group through the input module 510, the object management module 553 performs a processing of emphasizing the selected object. For example, the object management module 553 forms a border in the periphery of the object selected by the user. In addition, the object management module 553 may emphasize the selected object by expanding the size of the selected object or by changing the color or transparency of the selected object or may emphasize the object selected by the user by changing display of other non-selected objects. For example, as illustrated in FIG. 8A, when the item TV 711 is selected on the menu list 710, the object management module 553 allows the user to concentrate his/her attention on the item TV by making the non-selected items, that is, the item DVD 712, the item INTERNET 713, and the item GAME 714 translucent.

Figure 9A:
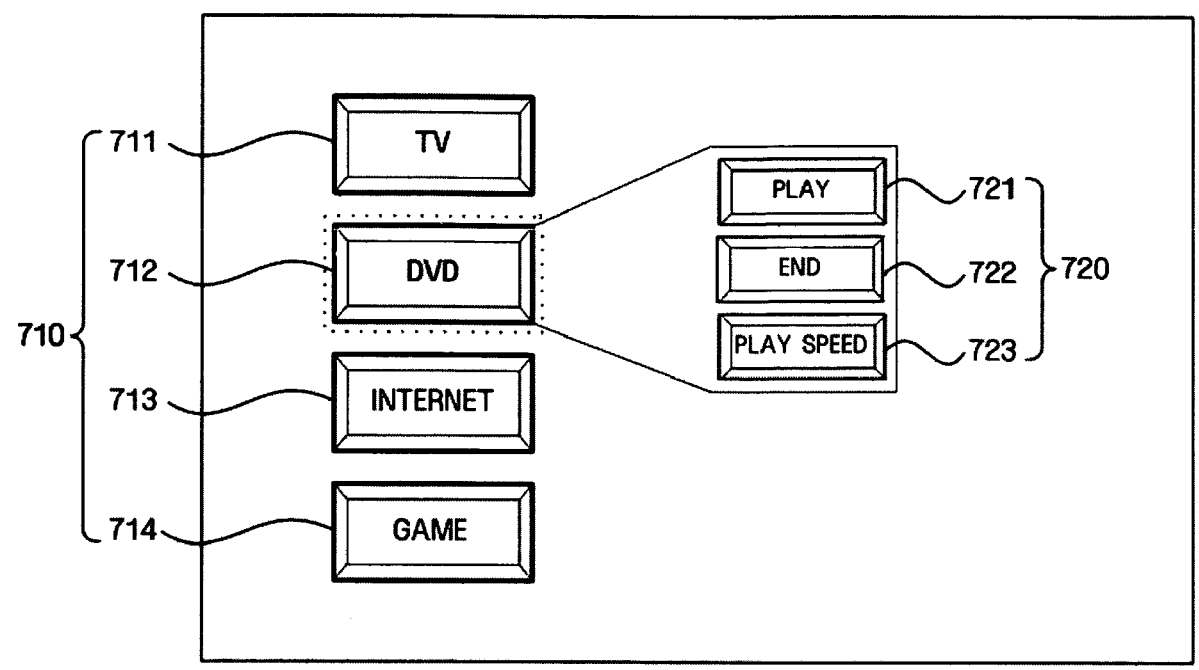
Figure 10A:
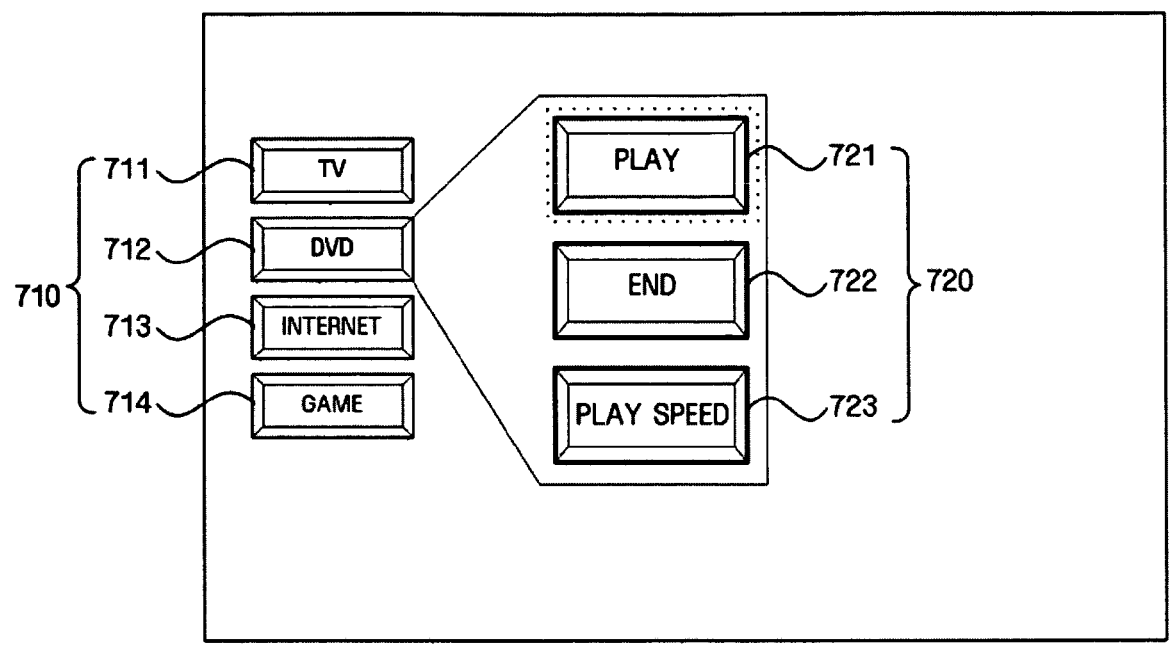
Figure 10B:
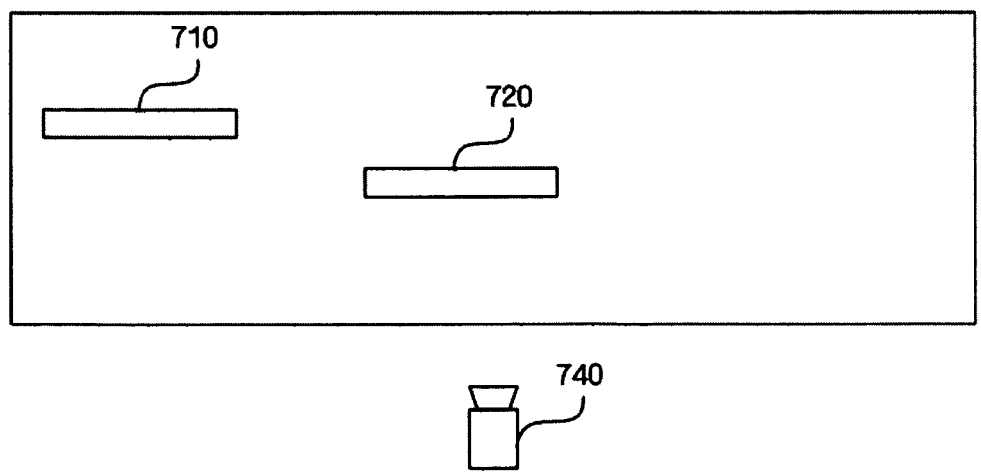

The motion processing module 552 processes the motions of the objects in the three-dimensional space on the basis of data input through the input module 510. More specifically, the motion processing module 552 processes data required for moving an object group including the object selected by the user toward the user. For example, as illustrated in FIG. 9A, when the item PLAY SPEED 723 is selected by the user in a state where a submenu group 720 of the item DVD 712 is output, the motion processing module 552 moves the submenu group 720 including the item PLAY SPEED 723 toward the user along the Z axis, as shown in FIGS. 10A and 10B. As a result, the submenu group 720 including the item PLAY SPEED 723 is presented close to the user compared with the menu list 710 including the item DVD 712. In the above example, a case where the object group including the object selected by the user moves toward the user has been described, but object groups not including the object selected by the user may move away from the user.

The motion processing module 552 processes data required for changing a view point 740 to the object group including the object selected by the user. For example, when the item PLAY SPEED 723 is selected on the screen illustrated in FIG. 9A, the motion processing module 552 arranges the submenu group including the item PLAY SPEED 723 close to the user and changes the view point 740 to the submenu group including the item PLAY SPEED 723, as illustrated in FIGS. 10A and 10B. Accordingly, importance of the information can stand out in relief.

The output module 540 visually expresses the processing result of the user interface module 550. If the three-dimensional GUI is displayed through the output module 540, the user can select a predetermined object using the input module 510. For example, when the menu list 710 is displayed through the output module 540, the user can select a desired item using the input module 510. The output module 540 may be implemented separately from the input module 510 in hardware or may be implemented integrally with input module 510, such as a touch screen, a touch pad, or the like.

Next, a method of providing a three-dimensional graphic user interface according to an exemplary embodiment of the present invention will be described with reference to FIGS. 8A to 13. Here, FIG. 8A to FIG. 12B are diagrams and top views illustrating a screen that is provided by the three-dimensional GUI providing apparatus 500. FIG. 13 is a flow chart illustrating a process of providing a three-dimensional graphic user interface according to the exemplary embodiment of the present invention.

Figure 8B:
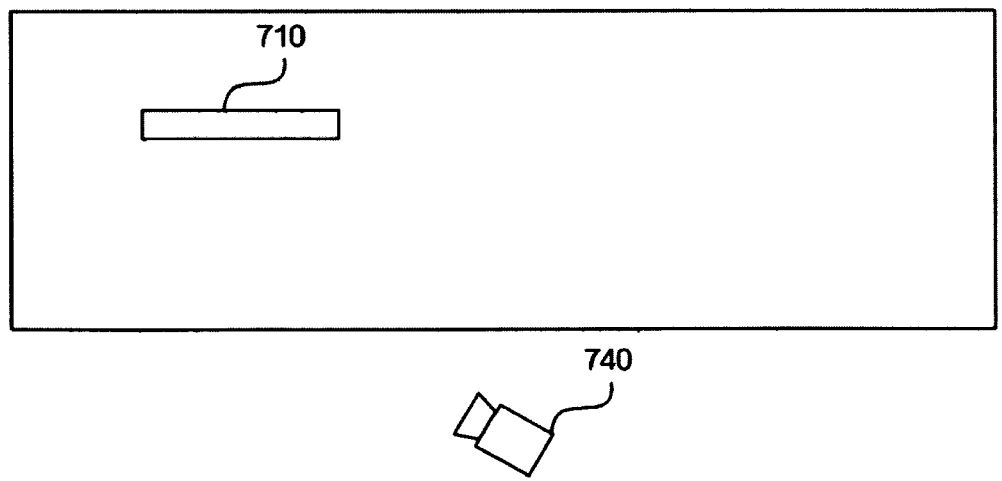

Referring to FIGS. 7A and 8A, if a command for outputting a predetermined object group is input through the input module 510, the user interface module 550 configures the corresponding object group on the basis of the information stored in the storage module 520, that is, the objects constituting the object group, the positional information of the individual objects, and the attribute information of the individual objects (S810), and then outputs the object group through the output module 540 (S820). For example, when the menu key (not shown) is operated through the input module 510, the user interface module 550 configures the menu list 710 with reference to the information in the storage module 520, as illustrated in FIGS. 8A and 8B, and outputs the menu list 710 through the output module 540.

Subsequently, the user interface module 550 discriminates the kind of the command input through the input module 510.

If an object selection command is input through the input module 510 (S830, a selection command), the user interface module 550 discriminates whether or not an object in the same object group is selected according to the input command (S840).

As the discrimination result, when the object in the same object group is selected (S840, YES), the user interface module 550 performs a processing of emphasizing the selected object (S870). For example, when a down key (not shown) is operated once on the screen illustrated in FIG. 8A, the user interface module 550 selects the item DVD 712, as illustrated in FIG. 9A. Subsequently, the user interface module 550 forms the border in the periphery of the item DVD 712 so as to emphasize the item DVD 712.

Here, a method of emphasizing the selected object may be implemented by various forms. For example, at least one of the size, color, and transparency of the selected object may be changed so as to emphasize the selected object. Alternatively, the attributes of the non-selected objects may be changed so as to emphasize the object selected by the user.

After emphasizing the object selected by the user, the user interface module 550 judges whether or not the low-level object group of the selected object exists (S880). That is, it is judged whether or not the submenu of the selected item exists.

As the judgment result, when the low-level object group of the selected object exists (S880, YES), the user interface module 550 presents the low-level object group on one side of the object group including the selected object (S890). The low-level object group may be presented farther from the user along the Z axis than the object group including the object selected by the user.

Figure 9B:
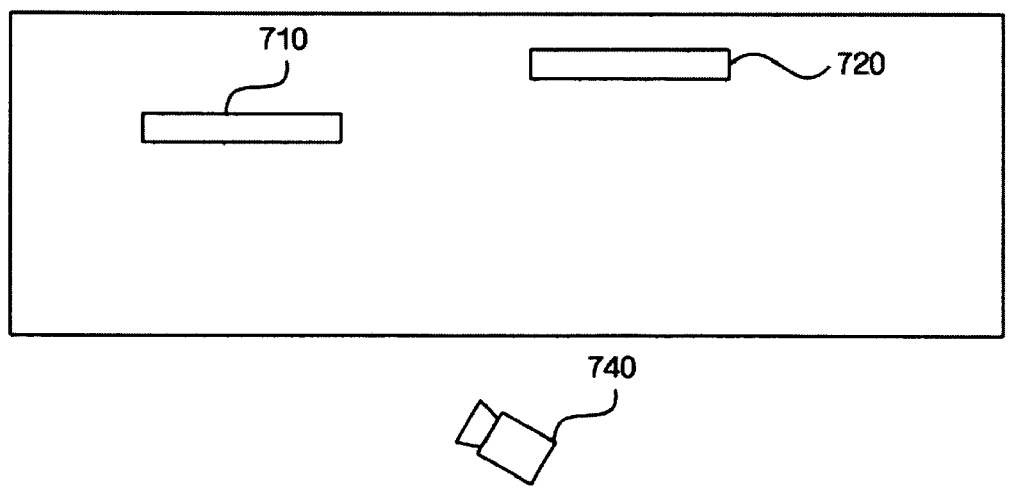

For example, when the down key (not shown) is operated once on the screen shown in FIG. 8A, the user interface module 550 selects the item DVD 712, and then judges whether or not the submenu of the item DVD 712 exists. When the item DVD 712 includes the submenu, such as PLAY, STOP, and PLAY SPEED, the user interface module 550 presents the submenu group 720 of the item DVD 712 on one side of the item DVD 712 with reference to the information stored in the storage module 520, as illustrated in FIG. 9A. At this time, the submenu group 720 of the item DVD 712 may be presented farther from the user along the Z axis than the menu group 710 including the item DVD 712, as illustrated in FIG. 9B.

Next, if the object selection command is input through the input module 510, the user interface module 550 discriminates whether or not the object in the same object group is selected according to the input command.

As the discrimination result, when the object in the same group is not selected, that is, when an object in another group is selected, the user interface module 550 moves the object group including the object selected by the user toward the user along the Z axis. The object group including the object selected by the user may be presented ahead of other object groups.

For example, when a right key (not shown) is operated on the screen illustrated in FIG. 9A and the item PLAY 721 is selected, the motion processing module 552 of the user interface moves the submenu group 720 including the item PLAY 721 toward the user along the Z axis. As a result, as illustrated in FIGS. 10A and 10B, the submenu group 720 of the item DVD 712 is presented closer to the user than to the menu group 710 including the item DVD 712.

As such, when moving the object group including the selected object, the user interface module 550 may change the view point 740 toward the object group including the object selected by the user. For example, as shown in FIG. 10B, the user interface module 550 changes the view point 740 toward the submenu group 720 including the item PLAY 721.

Subsequently, the user interface module 550 emphasizes the selected object and judges whether or not the low-level object group of the selected object exists. That is, as illustrated in FIG. 10A, the item PLAY 721 is emphasized, and it is judged whether or not the submenu of the item PLAY 721 exists. As the judgment result, since the submenu of the item PLAY 721 does not exist, the user interface module 550 keeps the current state.

In the state illustrated in FIG. 10A, when the object selection command is input again, the user interface module 550 repeats the above-described process.

Figure 11A:
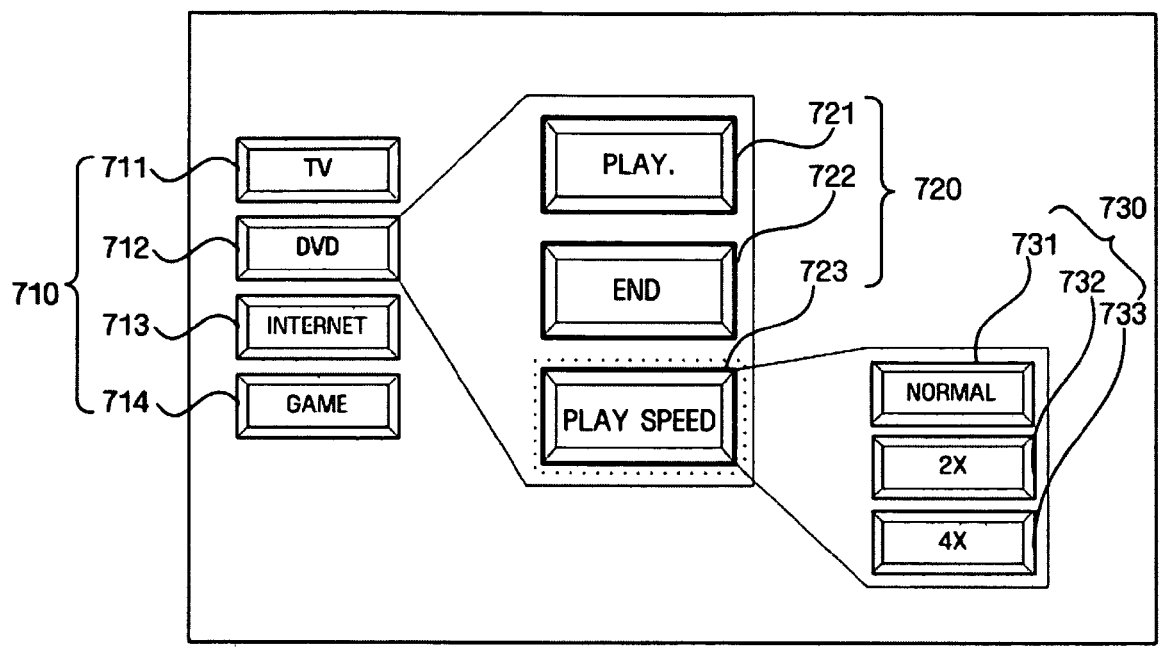

For example, when the down key (not shown) is operated two times on the screen illustrated in FIG. 10A, the user interface module 550 selects the item PLAY SPEED 723, as illustrated in FIG. 11A, and performs processing of emphasizing the item PLAY SPEED 723. The user interface module 550 judges whether or not the submenu of the item PLAY SPEED 723 exists. When the item PLAY SPEED 723 includes the submenu of the item NORMAL 731, the item 2X 732, and the item 4X 733, the user interface module 550 presents a submenu group 730 of the item PLAY SPEED 723 behind the menu group 720 including the item PLAY SPEED 723, as illustrated in FIG. 11B.

If the item NORMAL 731 is selected according to data input through the input module 510, the user interface module 550 moves the menu group 730 including the item NORMAL

Figure 12A:
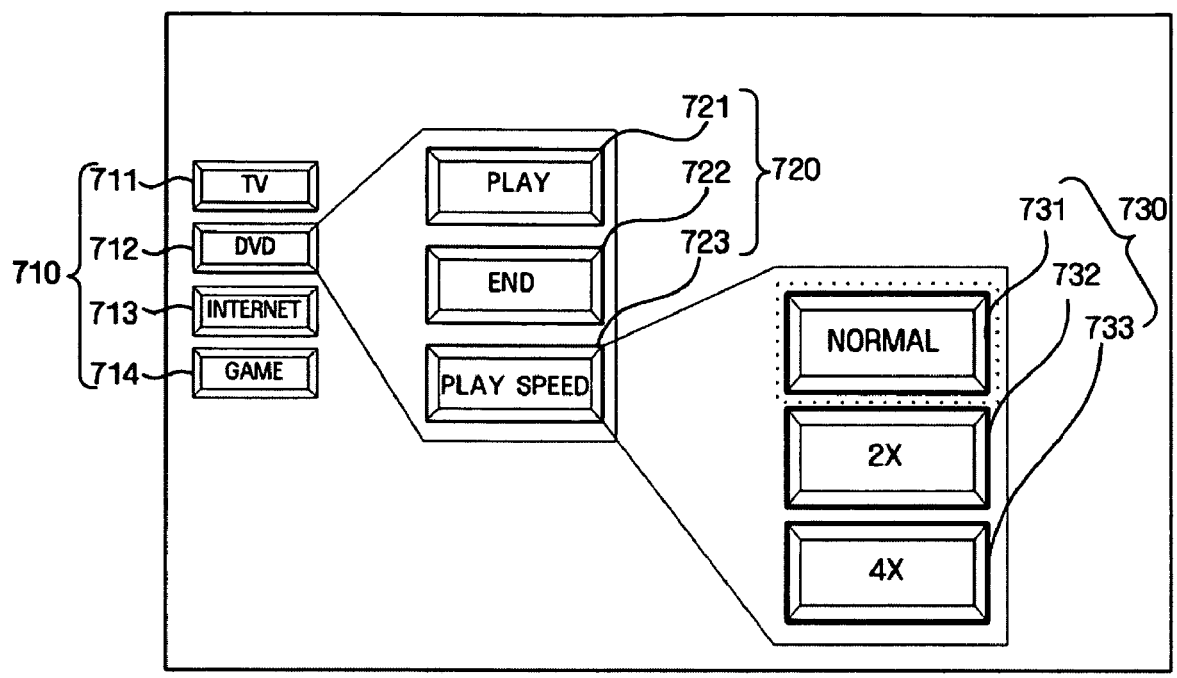
Figure 12B:
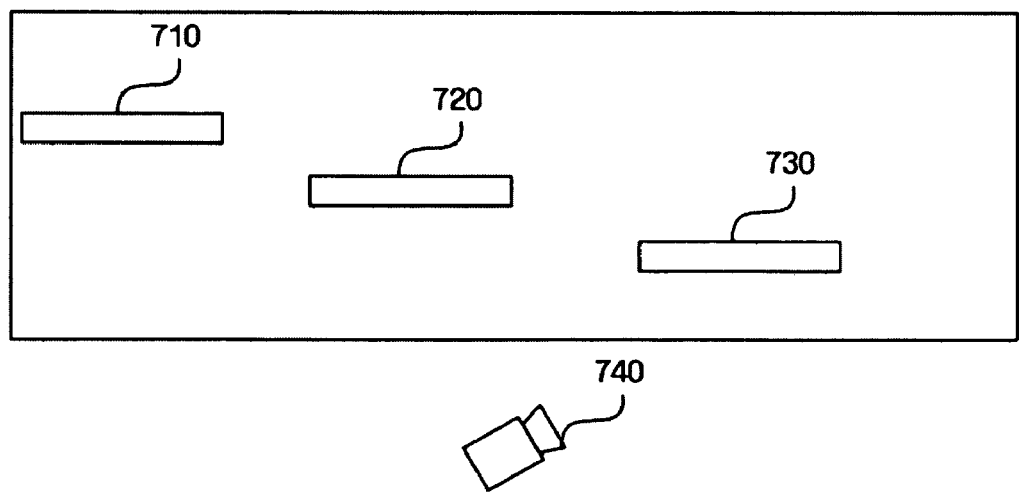
Figure 13:
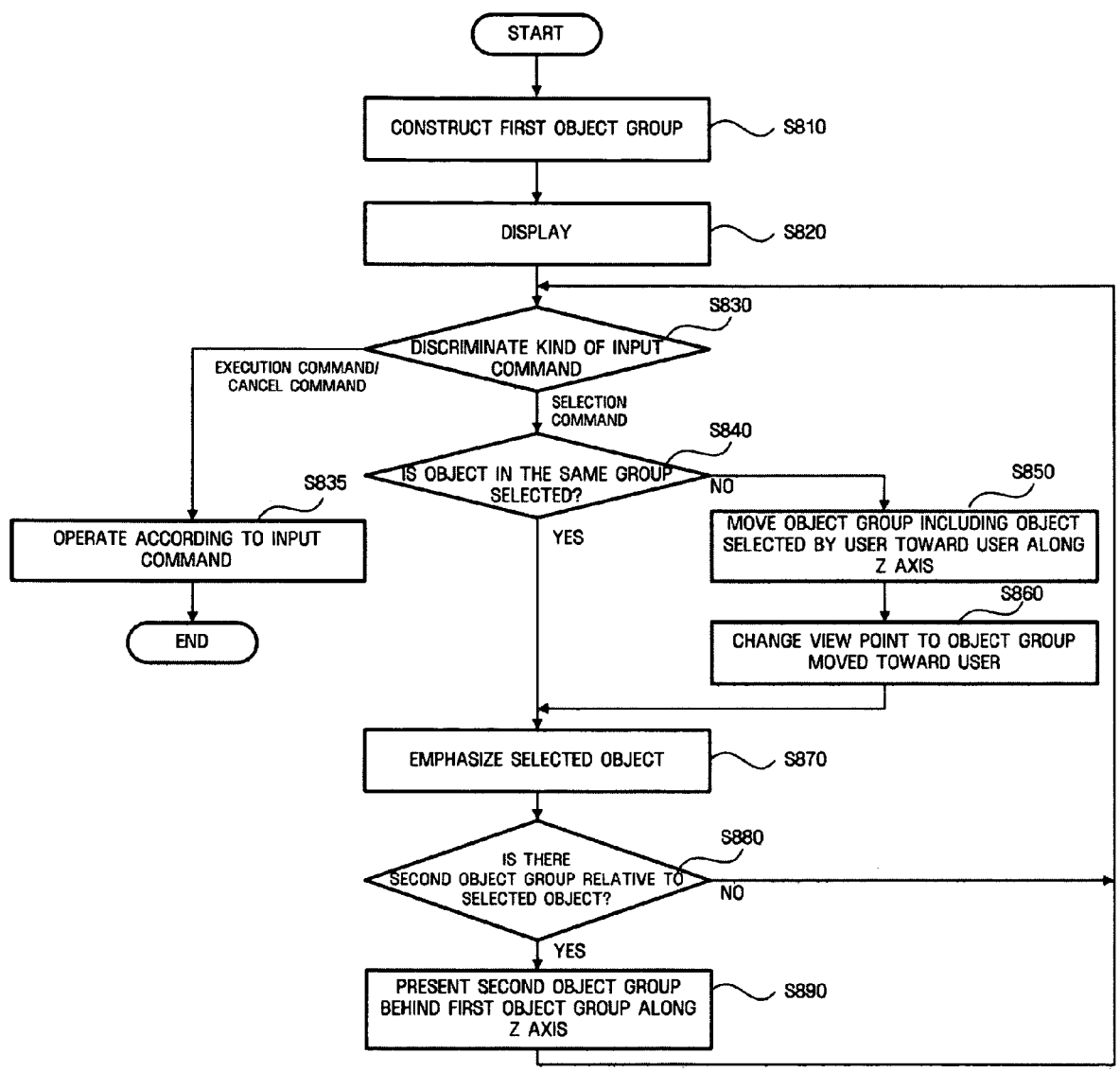
FIG. 13 is a flow chart illustrating a method of providing a three-dimensional GUI according to an exemplary embodiment of the present invention.

731 closer to the user than the menu group 720 including the item PLAY SPEED 723, as illustrated in FIG. 12B. The user interface module 550 changes the view point 740 to the menu group 730 including the item NORMAL 731. As a result, the screen illustrated in FIG. 12A can be output.

Figure 11B:
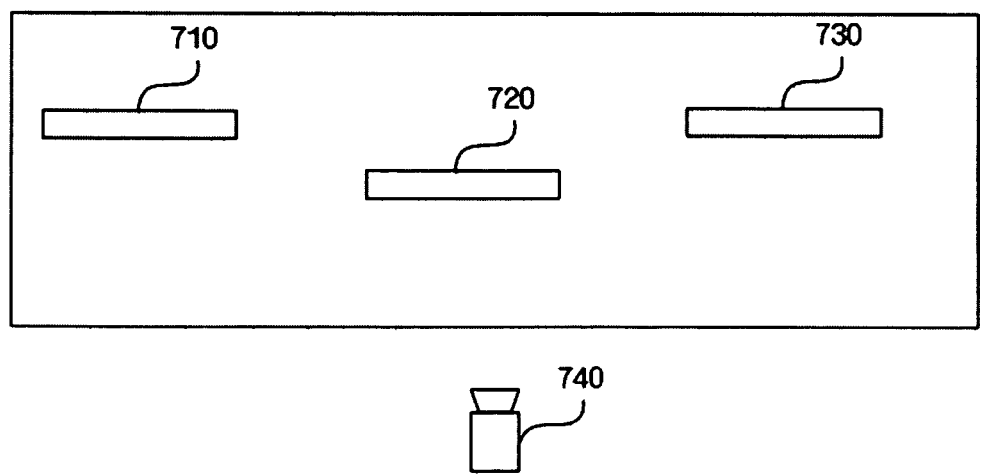

In the state illustrated in FIG. 12A, if a left key (not shown) is operated and the item PLAY SPEED 723 is selected again, the user interface module 550 moves the submenu group 730 of the item PLAY SPEED 723 distant from the user along the Z axis and presents the menu group 720 including the item PLAY SPEED 723 close to the user again, as illustrated in FIG. 11B. Simultaneously, the user interface module 550 changes the view point 740 to the menu group 720 including the item PLAY SPEED 723 as illustrated in FIG. 11B.

As described above, the process result by the user interface is displayed through the output module 540. That is, the result of emphasizing the selected item is displayed through the output module 540. Further, since the focus moves among the menu groups, a process of moving the menu group including the item selected by the user to a position close to the user, and changing the view point is successively display through the output module 540.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

As described above, according to the three-dimensional GUI, and the apparatus and method of providing the same of the present invention, the following effects can be obtained.

First, since the object group including the object selected by the user moves toward the user, and the view point changes to the object group, it is possible to make information transmission intuitive, and to satisfy the sensitivity of the user.

Second, it is possible to easily grasp the relationship between information, and the flow of information.

What is claimed is:

1. An apparatus for providing a three-dimensional graphic user interface, the apparatus comprising:
    a control module which creates a three-dimensional interface space having a predetermined plane and an axis perpendicular to the predetermined plane, a plurality of three-dimensional high-level objects, and a plurality of three-dimensional low-level objects presented in the three-dimensional interface space; and
    a user interface module which presents at least one high-level object group including the plurality of high-level objects for selection in a first plane at a foremost position in the three-dimensional interface space parallel to the predetermined plane, and in response to selection of one of the plurality of high-level objects changes a color of the selected high-level object so as to emphasize the selected high-level object and presents at least one low-level object group including the plurality of low-level objects for selection as a submenu of the selected one of the plurality of high-level objects in a second plane parallel to the predetermined plane in the three-dimensional interface space at a position further from a user than the at least one high-level object group in the first plane, and in response to selecting a low-level object from the low-level object group, the user interface module changes a color of the selected low-level object so as to emphasize a selected low-level object and moves the low-level object group including the selected low-level object along the perpendicular axis to a third plane at a new foremost position in the three-dimensional interface space parallel to the predetermined plane closer to the user than the first plane, and simultaneously changes a view point to a direction toward the low-level object group including the selected object while also displaying the at least one high-level object group,
    wherein at least one of the control module and the user interface module is a hardware unit.

2. The apparatus of claim 1, wherein the plurality of object groups comprises:
    a high-level object group including a plurality of high-level objects; and
    a low-level object group including a plurality of low-level objects associated with a high-level selected object among the plurality of high-level objects.

3. The apparatus of claim 2, wherein the low-level object group is presented in the three-dimensional interface space only when the associated high-level object is selected.

4. The apparatus of claim 1, wherein the user interface module changes at least one of a size and transparency of the selected object so as to emphasize the selected object.

5. The apparatus of claim 1, wherein the user interface module changes at least one of the size, color, and transparency of objects not selected so as to emphasize the selected object.

6. The apparatus of claim 1, wherein each of the objects comprises one or more surfaces, on which information to be transmitted to a user is displayed.

7. A method of providing a three-dimensional graphic user interface, the method comprising:
    creating a three-dimensional interface space having a predetermined plane and an axis perpendicular to the predetermined plane, a plurality of three-dimensional high-level objects, and a plurality of three-dimensional low-level objects presented in the three-dimensional interface space;
    presenting at least one high-level object group including the plurality of high-level objects for selection in a first plane at a foremost position in the three-dimensional interface space parallel to the predetermined plane, and in response to selection of one of the plurality of high-level objects changing a color of the selected high-level object so as to emphasize the selected high-level object and presenting at least one low-level object group including the plurality of low-level objects for selection as a submenu of the selected one of the plurality of high-level objects in a second plane parallel to the predetermined plane in the three-dimensional interface space at a position further from a user than the at least one high-level object group in the first plane; and
    in response to selecting a low-level object from the low-level object group, changing a color of the selected low-level object so as to emphasize the selected low-level object and moving the low-level object group including the selected low-level object along the perpendicular axis to a third plane at a new foremost position in the three-dimensional interface space parallel to the predetermined plane closer to the user than the first plane, and simultaneously changing a view point to a direction toward the low-level object group including the selected object while also displaying the at least one high-level object group.

8. The method of claim 7, wherein the plurality of object groups comprises:
    a high-level object group including a plurality of high-level objects; and a low-level object group including a plurality of low-level objects associated with a high-level selected object among the plurality of high-level objects.

9. The method of claim 8, wherein the presenting of the plurality of object groups comprises presenting the low-level object group in the three-dimensional interface space only when the associated high-level object is selected.

10. The method of claim 7, wherein the moving of the object group further comprises changing at least one of a size and transparency of the selected object so as to emphasize the selected object.

11. The method of claim 7, wherein the moving of the object group comprises changing at least one of the size, color, and transparency of objects not selected so as to emphasize the selected object.

12. A system for providing a three-dimensional graphic user interface, said system comprising:
   a control module which creates a three-dimensional space having a predetermined plane and an axis perpendicular to the predetermined plane, and a plurality of three-dimensional objects;
   an input module which receives data related to an action of the at least one of the plurality of three-dimensional objects;
   an output module, and
   and object management module,
   wherein the output module displays at least one high-level object group including a plurality of high-level objects in a first plane parallel to the predetermined plane in the three-dimensional space, and in response to selection of one of the plurality of high-level objects changes a color of the selected high-level object so as to emphasize the selected high-level object and displays at least one low-level object group as a submenu of the selected one of the plurality of high-level objects including a selected low-level object in a second plane parallel to the predetermined plane, among a plurality of presented object groups,
   wherein the at least one low-level object group including the selected low-level object is displayed at a new foremost position in the three-dimensional space along the perpendicular axis in a third plane parallel to the predetermined plane and a color of the selected low-level object is changed so as to emphasize the selected low-level object,
   wherein the object management module simultaneously changes a view point to a direction toward the object group in the third plane including the selected object based on input to the input module while also displaying the at least one high-level object group in the first plane, and
   wherein at least one of the control module, the input module, the output module and the object management module is a hardware unit.

13. The system of claim 12, wherein the output module displays a plurality of object groups comprising a high-level object group including a plurality of high-level objects, and a low-level object group including a plurality of low-level objects associated with a high-level selected object among the plurality of high-level objects.

14. The system of claim 13, wherein the output module displays the low-level object group in the space only when the user selects the associated high-level object.

15. The system of claim 14, wherein the output module displays the low-level object group in the three-dimensional space at a position along the perpendicular axis further from a user than the at least one high-level object group containing the associated high-level object.

16. The system of claim 12, wherein the object management module changes at least one of a size and transparency of the object selected based on input to the input module so as to emphasize the selected object.

17. The system of claim 12, wherein the object management module changes at least one of the size, color, and transparency of objects not selected so as to emphasize the selected object.

18. The system of claim 12, wherein the output module displays each of the objects comprising one or more surfaces on which information to be transmitted to a user is displayed.

19. A non-transitory computer readable medium having stored therein a program for causing a processing device to execute a method for providing a three-dimensional graphic user interface, the program instructions comprising:
   creating a three-dimensional interface space having a predetermined plane and an axis perpendicular to the predetermined plane, a plurality of three-dimensional high-level objects, and a plurality of three-dimensional low-level objects presented in the three-dimensional interface space;
   presenting at least one high-level object group including the plurality of high-level objects for selection in a first plane at a foremost position in the three-dimensional interface space parallel to the predetermined plane, and in response to selection of one of the plurality of high-level objects changing a color of the selected high-level object so as to emphasize the selected high-level object and presenting at least one low-level object group including the plurality of low-level objects for selection as a submenu of the selected one of the plurality of high-level objects in a second plane parallel to the predetermined plane in the three-dimensional interface space at a position further from a user than the at least one high-level object group in the first plane; and
   in response to selecting a low-level object from the low-level object group, changing a color of the selected low-level object so as to emphasize the selected low-level object and moving the low-level object group including the selected low-level object along the perpendicular axis to a third plane at a new foremost position in the three-dimensional interface space parallel to the predetermined plane closer to the user than the first plane, and simultaneously changing a view point to a direction toward the low-level object group including the selected object while also displaying the at least one high-level object group.

20. The non-transitory computer readable medium of claim 19, wherein the plurality of object groups presented by the program instructions comprises:
   a high-level object group including a plurality of high-level objects; and
   a low-level object group including a plurality of low-level objects associated with a high-level selected object among the plurality of high-level objects.

21. The non-transitory computer readable medium of claim 20, wherein the program instructions for presenting of the plurality of object groups comprises presenting the low-level object group in the space only when the associated high-level object is selected.

22. The non-transitory computer readable medium of claim 19, wherein the program instructions for the moving of the object group further comprises changing at least one of a size and transparency of the selected object so as to emphasize the selected object.

23. The non-transitory computer readable medium of claim 19, wherein the program instructions for the moving of the object group comprises changing at least one of the size, color, and transparency of objects not selected so as to emphasize the selected object.

24. The non-transitory computer readable medium of claim 19, wherein the processing device executing the program instructions is a computer.

25. The non-transitory computer readable medium of claim 19, wherein the program instructions further comprise displaying information to be transmitted to a user on one or more surfaces of each of the objects.

* * * * *